(12) United States Patent
Rodrigues et al.

(10) Patent No.: US 12,406,475 B2
(45) Date of Patent: Sep. 2, 2025

(54) IMAGE AUGMENTATION APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 18/021,517

(22) PCT Filed: Aug. 25, 2020

(86) PCT No.: PCT/JP2020/031942
§ 371 (c)(1),
(2) Date: Feb. 15, 2023

(87) PCT Pub. No.: WO2022/044105
PCT Pub. Date: Mar. 3, 2022

(65) Prior Publication Data
US 2023/0298323 A1  Sep. 21, 2023

(51) Int. Cl.
*G06V 10/774* (2022.01)
*G06F 18/214* (2023.01)
*G06T 5/77* (2024.01)
*G06T 7/11* (2017.01)
*G06T 7/174* (2017.01)
*G06V 10/26* (2022.01)
*G06V 20/10* (2022.01)

(52) U.S. Cl.
CPC .......... *G06V 10/774* (2022.01); *G06F 18/214* (2023.01); *G06T 5/77* (2024.01);
(Continued)

(58) Field of Classification Search
CPC ..... G06V 20/13–188; G06V 20/10–17; G06V 20/54–588; G06V 20/176–188;
(Continued)

(56) References Cited

U.S. PATENT DOCUMENTS

2014/0161362 A1  6/2014  Cao et al.
2020/0202487 A1  6/2020  Viswanathan
(Continued)

FOREIGN PATENT DOCUMENTS

JP  2019-207535 A  12/2019

OTHER PUBLICATIONS

Maxim Shugaev, ArcGeo: Localizing Limited Filed-of-View Image using Cross-View Matching , Jan. 3, 2024 (Year: 2024).*
(Continued)

*Primary Examiner* — Andrew W Bee
*Assistant Examiner* — Caleb L Esquino
(74) *Attorney, Agent, or Firm* — Sughrue Mion, PLLC

(57) ABSTRACT

An image augmentation apparatus (2000) performs an image augmentation process on an original training dataset (40) to generate an augmented training dataset (50). The original training dataset (40) includes an original ground-view image (42) and an original aerial-view image (44). The image augmentation process includes a removal process in which partial regions including objects of a specific type are removed. The image augmentation apparatus (2000) performs the image augmentation process on the original ground-view image (42) to generate an augmented ground-view image (52), on the original aerial-view image (44) to generate an augmented aerial-view image (54), or both.

20 Claims, 12 Drawing Sheets

(52) U.S. Cl.
CPC ............... *G06T 7/11* (2017.01); *G06T 7/174* (2017.01); *G06V 10/273* (2022.01); *G06V 20/10* (2022.01); *G06T 2207/10032* (2013.01); *G06T 2207/20081* (2013.01)

(58) Field of Classification Search
CPC .. G06V 20/35–39; G06V 10/70; G06V 10/82; G06V 10/774–7796; G06V 10/454; G06T 2207/10032; G06T 2207/30248–30264; G06T 2207/20081; G06T 2207/20084; G06T 9/002; G06T 5/60; G06F 18/214–2155; G06F 7/023; G06F 40/16; G06N 3/08–0985; G06N 3/02–126; G06N 20/00–20; G06K 9/6256; G06K 9/6257; G06K 9/6259; G01N 29/4481
See application file for complete search history.

(56) References Cited

U.S. PATENT DOCUMENTS

2022/0292619 A1* 9/2022 Kozikowski ......... G06Q 50/163
2023/0260312 A1* 8/2023 Agrawal ............. G06V 30/422
382/113

OTHER PUBLICATIONS

Hilmi Kumdakci, Generative Data Augmentation for Vehicle Detection in Aerial Images, Dec. 9, 2020 (Year: 2020).*
International Search Report for PCT Application No. PCT/JP2020/031942, mailed on Nov. 10, 2020.
Written opinion for PCT Application No. PCT/JP2020/031942, mailed on Nov. 10, 2020.
Liu Liu and Hongdong Li, "Lending Orientation to Neural Networks for Cross-view Geo-localization", Computer Research Repository, abs/1903.12351, Mar. 29, 2019.
Zhun Zhong, Liang Zheng, Guoliang Kang, Shaozi Li, Yi Yang, "Random Erasing Data Augmentation", Computer Research Repository, abs/1708.04896, Aug. 16, 2017.
Liu Liu et al., "Lending Orientation to Neural Networks for Cross-view Geo-localization", 2019 IEEE/CVF Conference on Computer Vision and Pattern Recognition (CVPR), 2019.06.20, pp. 5617-5626.
Zhun Zhong et al., "Random Erasing Data Augmentation", Nov. 16, 2017, Internet :<URL:https://arxiv.org/abs/1708.04896>.

* cited by examiner

IMAGE AUGMENTATION APPARATUS, CONTROL METHOD, AND NON-TRANSITORY COMPUTER-READABLE STORAGE MEDIUM

This application is a National Stage Entry of PCT/JP2020/031942 filed on Aug. 25, 2020, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a discriminator comprising a set of CNNs (Convolutional Neural Networks) for extracting features from a ground-view image and an aerial-view image to be compared with each other. Specifically, one of the CNNs acquires a ground-view image and orientation information corresponding thereto, and computes joint features from the mixed signal containing the ground-view image and the orientation information. The other one acquires an aerial-view image and orientation information corresponding thereto, and computes joint features from the mixed signal containing the aerial-view image and the orientation information. Then, whether the ground-view image matches the aerial-view image is determined based on the computed joint features.

In order to achieve precise ground-to-aerial cross-view matching, it is important to prevent the discriminator from overfitting the training image. In terms of avoidance of overfitting, NPL2 discloses a technique to erase one or more random rectangle regions from a training image using grey pixels or random pixels. By doing so, training images with various levels of occlusion are generated, which reduces the risk of over-fitting and makes the model robust to occlusion.

CITATION LIST

Non Patent Literature

NPL1: Liu Liu and Hongdong Li, "Lending Orientation to Neural Networks for Cross-view Geo-localization", Computer Research Repository, abs/1903.12351, Apr. 2, 2019
NPL2: Zhun Zhong, Liang Zheng, Guoliang Kang, Shaozi Li, Yi Yang, "Random Erasing Data Augmentation", Computer Research Repository, abs/1708.04896, Aug. 16, 2017

SUMMARY OF INVENTION

Technical Problem

A system of NPL2 determines a part of a training image to be erased in a random fashion. Due to this random nature of erasing, merely a part of an object is erased in NPL2.

An objective of the present disclosure is to provide a new technique to generate a training dataset including a ground-view image and an aerial-view image that enables to prevent a discriminator from overfitting the training dataset.

Solution to Problem

The present disclosure provides an image augmentation apparatus comprising at least one processor and memory storing instructions. The at least one processor is configured to execute the instructions to: acquire an original training dataset including an original ground-view image and an original aerial-view image; perform a removal process in which partial regions including objects of a specific type are removed, the removal process being performed: on the original ground-view image to generate the augmented ground-view image: on the original aerial-view image to generate the augmented aerial-view image; or both; and output an augmented training dataset that includes: the original ground-view image and the augmented aerial-view image; the augmented ground-view image and the original aerial-view image; or the augmented ground-view image and the augmented aerial-view image.

The present disclosure further provides a control method that is performed by a computer. The control method comprises: acquiring an original training dataset including an original ground-view image and an original aerial-view image; performing a removal process in which partial regions including objects of a specific type are removed, the removal process being performed: on the original ground-view image to generate the augmented ground-view image: on the original aerial-view image to generate the augmented aerial-view image; or both; and outputting an augmented training dataset that includes: the original ground-view image and the augmented aerial-view image; the augmented ground-view image and the original aerial-view image; or the augmented ground-view image and the augmented aerial-view image.

The present disclosure further provides a non-transitory computer readable storage medium storing a program. The program that causes a computer to execute: acquiring an original training dataset including an original ground-view image and an original aerial-view image; performing a removal process in which partial regions including objects of a specific type are removed, the removal process being performed: on the original ground-view image to generate the augmented ground-view image: on the original aerial-view image to generate the augmented aerial-view image; or both; and outputting an augmented training dataset that includes: the original ground-view image and the augmented aerial-view image; the augmented ground-view image and the original aerial-view image; or the augmented ground-view image and the augmented aerial-view image.

Advantageous Effects of Invention

According to the present disclosure, it is possible to provide a new technique to generate a training dataset including a ground-view image and an aerial-view image that enables to prevent a discriminator from overfitting the training dataset.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

<Overview>

Figure 1:
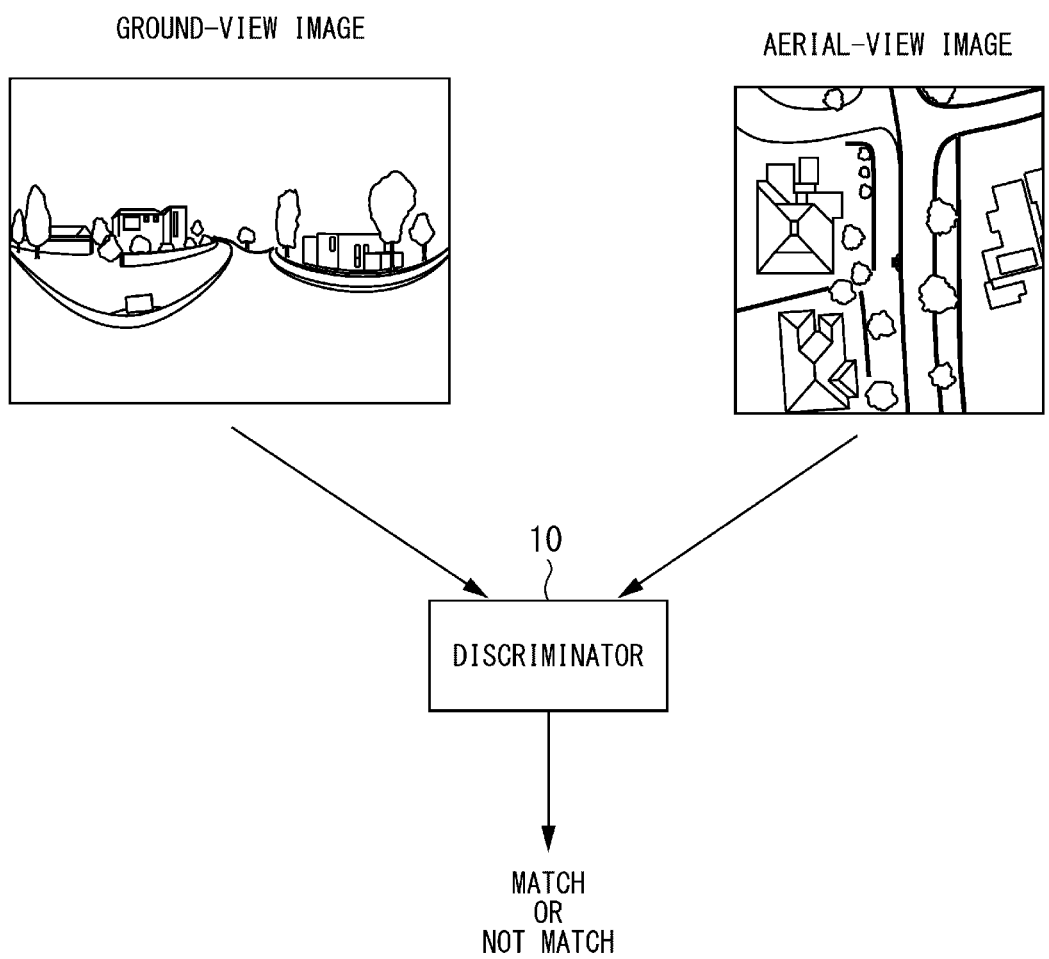
FIG. 1 illustrates a discriminator that is trained using the training data generated by a training data generation apparatus of the 1st example embodiment.

An image augmentation apparatus of the 1st example embodiment generates a training dataset with which a discriminator is trained. FIG. 1 illustrates a discriminator that is trained using the training data generated by the image augmentation apparatus 2000 of the 1st example embodiment. The discriminator 10 performs matching between a ground-view image and an aerial-view image (so-called ground-to-aerial cross-view matching). The ground-view image is an image including a ground view of a place. For example, the ground-view image is captured by pedestrians, cars, and etc. The ground-view image may be panoramic in nature (having 360-degree field of view), or may have limited (less than 360-degree) field of view. The aerial-view image is an image including a top view of a place. For example, the aerial-view image is captured by a drone, air plane, satellite, and etc. Specifically, the discriminator 10 acquires a ground-view image and an aerial-view image, and determines whether the acquired ground-view image matches the acquired aerial-view image. Note that "the ground-view image matches the aerial-view image" means that the location where the ground-view image is captured is included in the aerial-view image.

Figure 2:
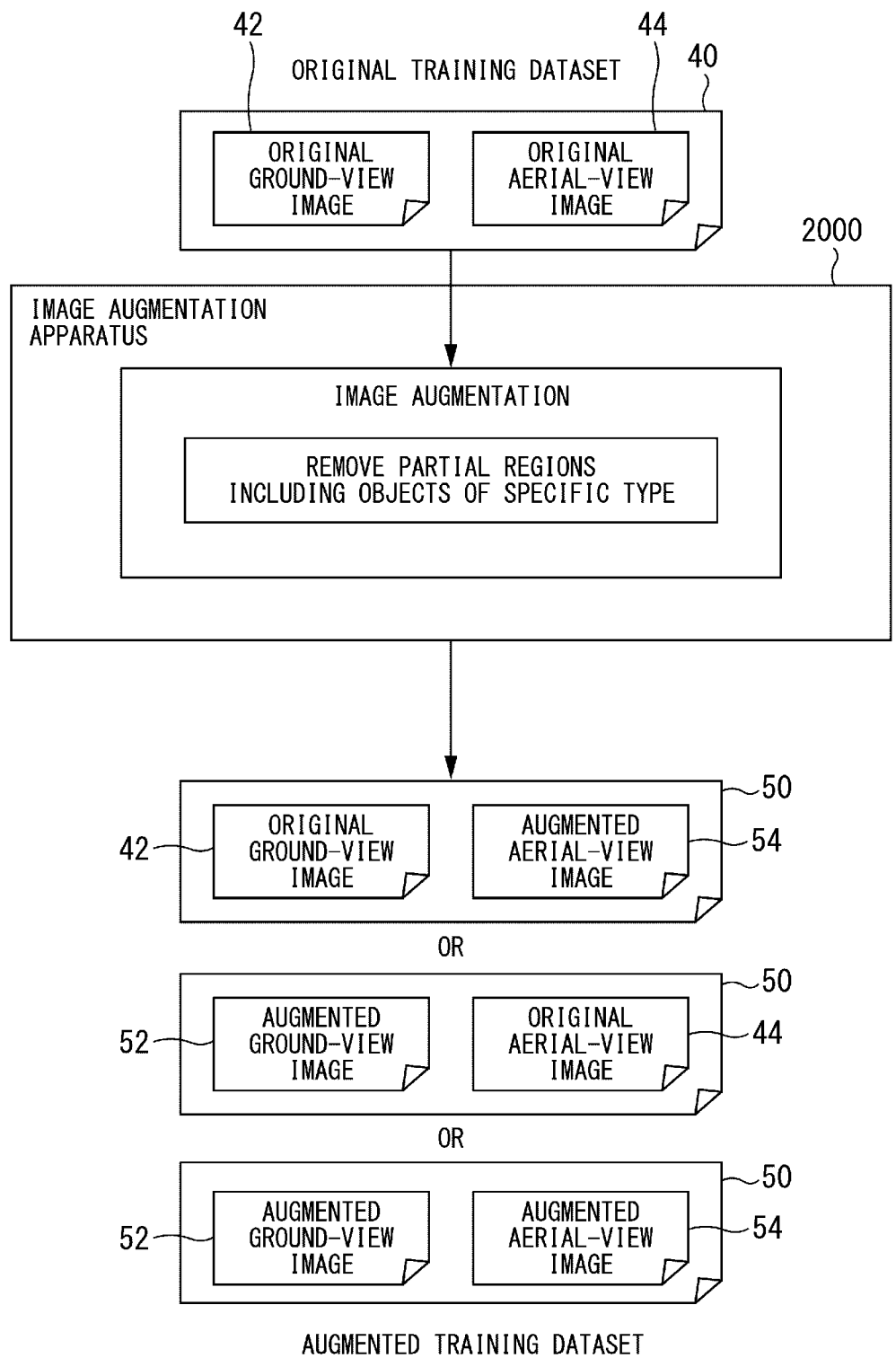
FIG. 2 illustrates an overview of the image augmentation apparatus of the 1st example embodiment.

FIG. 2 illustrates an overview of the image augmentation apparatus 2000 of the 1st example embodiment. The image augmentation apparatus 2000 receives an original training dataset 40 that includes an original ground-view image 42 and an original aerial-view image 44. Next, the image augmentation apparatus 2000 performs an image augmentation process on the original ground-view image 42, the original aerial-view image 44, or both, thereby generating a new training dataset (hereinafter, augmented training dataset 50). The augmented training dataset 50 includes 1) a pair of the original ground-view image 42 and the augmented aerial-view image 54, 2) a pair of the augmented ground-view image 52 and the original aerial-view image 44, or 3) a pair of the augmented ground-view image 52 and the augmented aerial-view image 54. Through the image augmentation process mentioned above, the image augmentation apparatus 2000 increases the number of training dataset for the training of the discriminator 10.

Hereinafter, the original ground-view image 42 and the original aerial-view image 44 are collectively called "an original image". Similarly, the augmented ground-view image 52 and the augmented aerial-view image 54 are collectively called "an augmented image". Using these terms, it can be described that the image generation apparatus 2000 performs the image augmentation process on the original image to generate the augmented image.

The purpose of the image augmentation process performed on the original image is to remove a region including objects of a specific type, such as a road, a tree, a building, etc. To do so, the image augmentation process includes, for example, detecting one or more partial regions that include objects of a specific type, and removing those partial regions from the original image.

Figure 3:
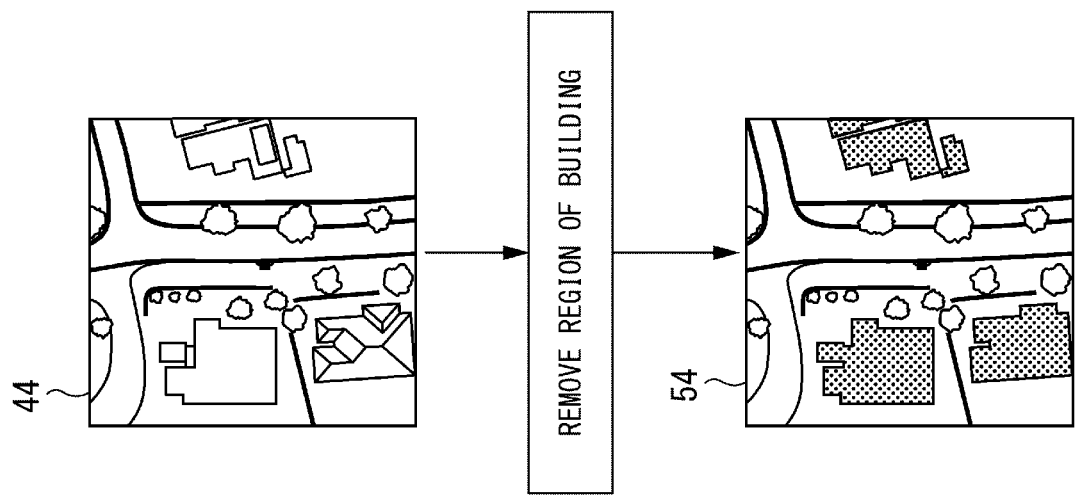
FIG. 3 illustrates a removal of a partial region from the original image.
Figure 3:
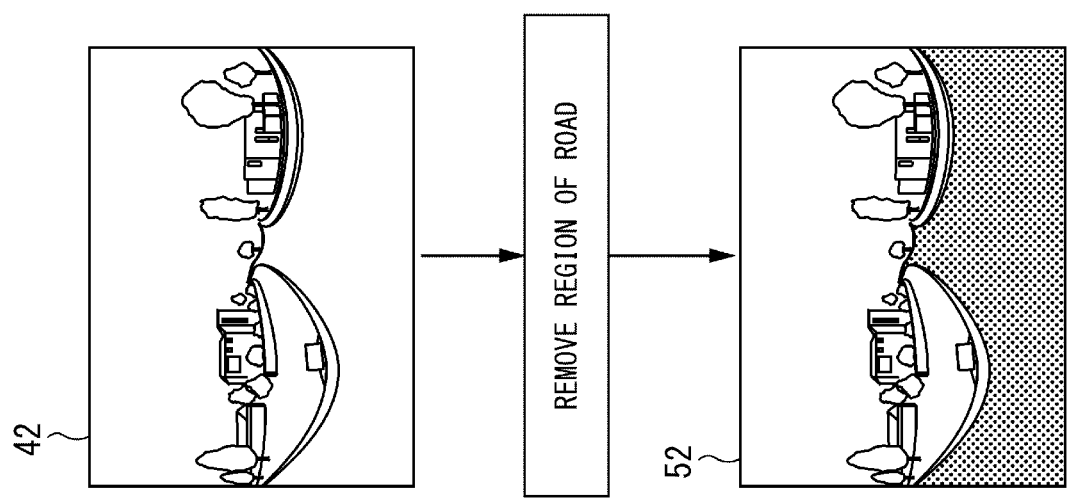

FIG. 3 illustrates a removal of a partial region from the original images. The left side of FIG. 3 shows a removal of a partial region from the original ground-view image 42. In this example, a specific type of object is a road. Thus, the partial region including the road is detected and removed from the original ground-view image 42 to generate the augmented ground-view image 52.

On the other hand, the right side of FIG. 3 shows a removal of a partial region from the original aerial-view image 44. In this example, a specific type of object is a building. Thus, the partial region including the building is detected and removed from the original aerial-view image 44 to generate the augmented aerial-view image 54.

In the examples of FIG. 3, the removal of the partial region is realized by repainting the partial region with black pixels. Note that, for ease of illustration, a dot pattern is used to represent a region filled with black pixels. As described later, a concrete way of removing the partial region from the original image is not limited to repainting with black pixels.

<Example of Advantageous Effect>

It is possible that the ground-view image includes features different from those of the aerial-view image to be matched the ground-view image. For example, if the aerial-view image is captured a certain time (e.g. a few months or years) after the ground-view image is captured, the aerial-view image may not include some objects that are included in the ground-view image or vice versa due to demolition or construction of buildings, felling or planting of trees, etc. In order to train the discriminator 10 to be robust to such temporary features, those temporary features should be removed from the training image.

According to the image augmentation apparatus 2000 of this example embodiment, the augmented image is generated by removing partial regions that include a specific type of objects. As a result, it is possible to train the discriminator 10 with the training image that does not include objects that may be temporary features of the scene in the training image. Thus, the discriminator 10 can be trained to be robust to temporary features of the images subject to ground-to-aerial cross-view matching.

Note that NPL2 discloses erasing one or more random rectangle region from the training image. However, in NPL2, a region to be removed from the training image is randomly determined without taking a type of object into account. Specifically, NPL2 discloses samples of the training images from which random rectangle regions are erased, and those samples demonstrate that not a whole but a part of an object is erased. Thus, it is considered that random erasing disclosed by NPL2 cannot train a discriminator for ground-to-aerial cross-view matching to be robust to temporary features of fed images.

Hereinafter, more detailed explanation of the image augmentation apparatus 2000 will be described.

<Example of Functional Configuration>

Figure 4:
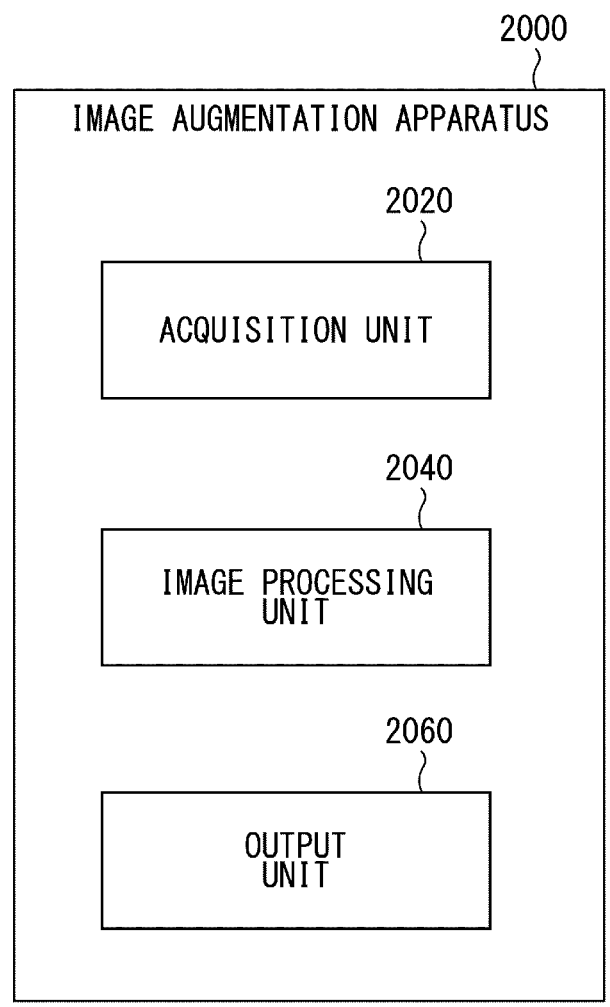
FIG. 4 is a block diagram illustrating an example of the functional configuration of the training apparatus of the 1st example embodiment.

FIG. 4 is a block diagram illustrating an example of the functional configuration of the image augmentation apparatus 2000 of the 1st example embodiment. The image augmentation apparatus 2000 includes an acquisition unit 2020, an image processing unit 2040, and an output unit 2060. The acquisition unit acquires the original dataset 40. The image processing unit 2040 performs the image augmentation process on the original training dataset 40. The image augmentation process includes to: 1) detect a partial region including objects of a specific type from an original image, and 2) remove the partial region from the original image to generate the augmented image. The original image on which the image augmentation process is performed may be the original ground-view image 42, the original aerial-view image, or both. The output unit 2060 outputs the augmented training dataset 50 that includes the augmented image.

<Example of Hardware Configuration of Image Augmentation Apparatus 2000>

The image augmentation apparatus 2000 may be realized by one or more computers. Each of the one or more computers may be a special-purpose computer manufactured for implementing the image augmentation apparatus 2000, or may be a general-purpose computer like a personal computer (PC), a server machine, or a mobile device. The image augmentation apparatus 2000 may be realized by installing an application in the computer. The application is implemented with a program that causes the computer to function as the image augmentation apparatus 2000. In other words, the program is an implementation of the functional units of the image augmentation apparatus 2000.

Figure 5:
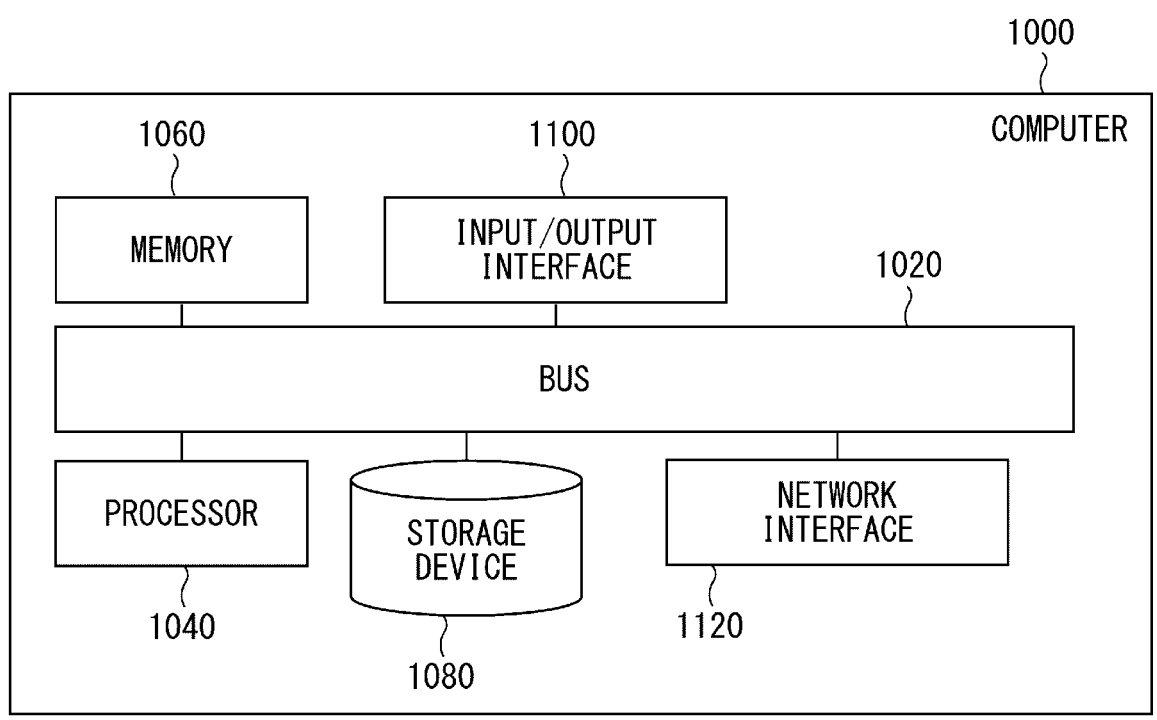
FIG. 5 is a block diagram illustrating an example of the hardware configuration of a computer realizing the training apparatus.

FIG. 5 is a block diagram illustrating an example of the hardware configuration of a computer 1000 realizing the image augmentation apparatus 2000. In FIG. 5, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processor, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the image augmentation apparatus 2000. In addition, the storage device 1080 may store the original training dataset 40.

The hardware configuration of the computer 1000 is not limited to the configuration shown in FIG. 5. For example, as mentioned-above, the image augmentation apparatus 2000 may be realized by plural computers. In this case, those computers may be connected with each other through the network.

<Flow of Process>

Figure 6:
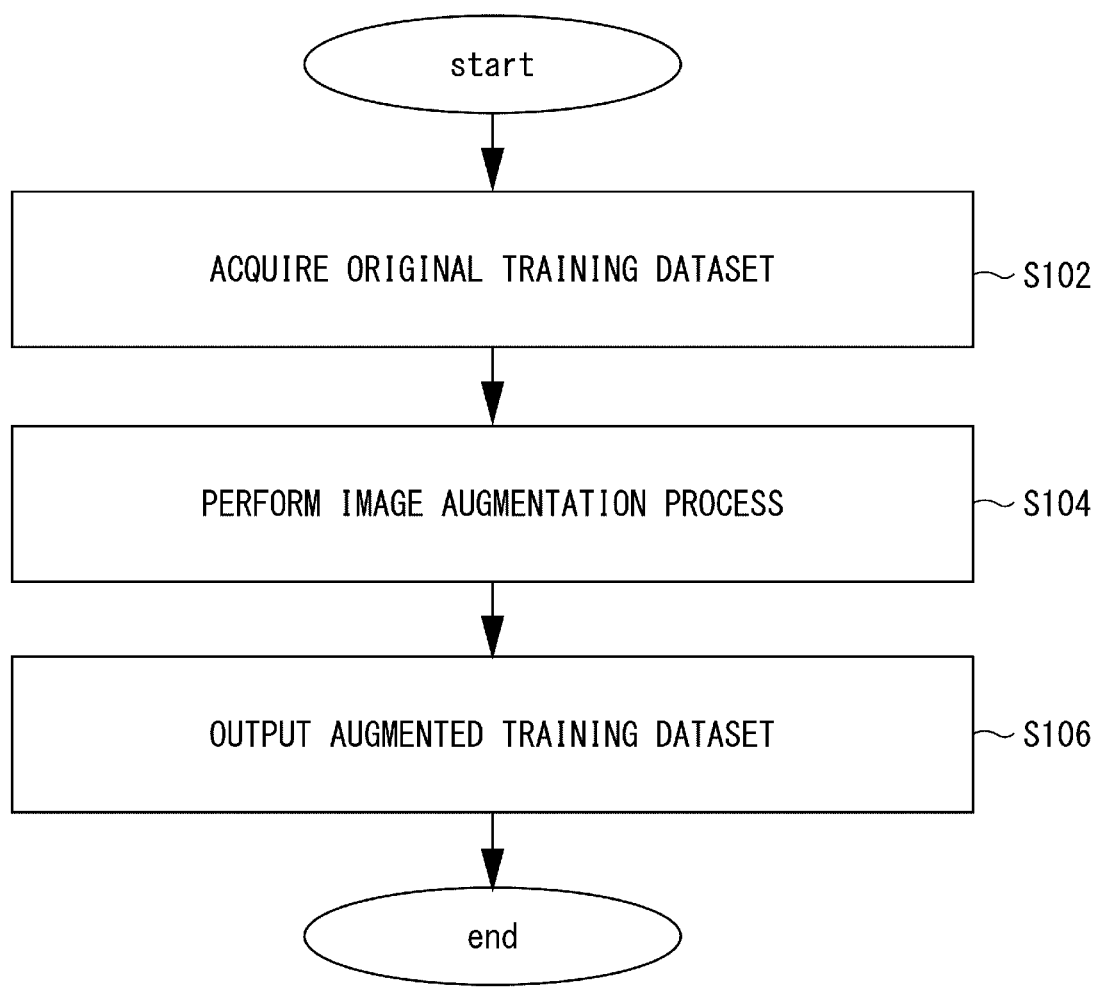
FIG. 6 is a flowchart illustrating an example flow of a process that the training apparatus of the 1st example embodiment performs.

FIG. 6 is a flowchart illustrating an example flow of a process that the image augmentation apparatus 2000 of the 1st example embodiment performs. The acquisition unit 2020 acquires the original training dataset 40 (S102). The image processing unit 2040 performs the image augmentation process on the original training dataset 40 to generate the augmented training dataset 50 (S104). The output unit 2060 outputs the augmented training dataset 50 (S106).

Figure 7:
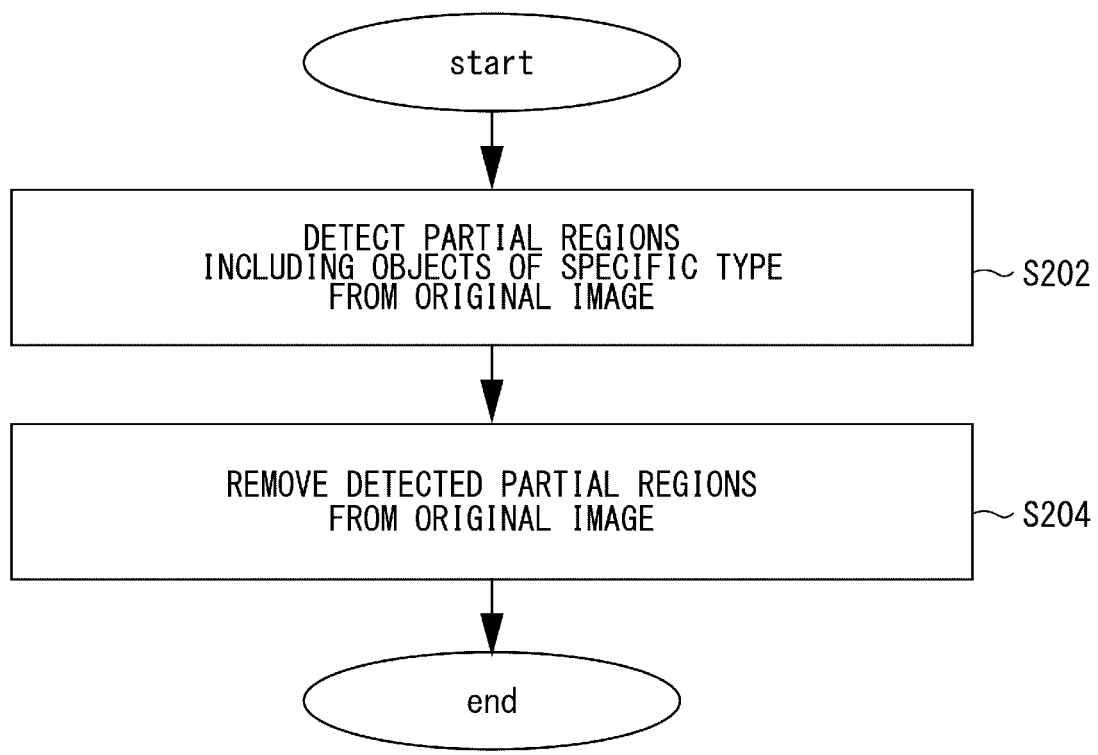
FIG. 7 is a flowchart illustrating an example flow of the image augmentation performed by the image processing unit.

FIG. 7 is a flowchart illustrating an example flow of the image augmentation process performed by the image processing unit 2040. The image processing unit 2040 detects partial regions including objects of a specific type (S202). The image processing unit 2040 removes the detected partial regions from the original image to generate the augmented image (S204). In order to generate the augmented ground-view image 52, the image augmentation process described in FIG. 7 is performed on the original ground-view image 42. Similarly, in order to generate the augmented aerial-view image 54, the image augmentation process described in FIG. 7 is performed on the original aerial-view image 44.

<Details of Discriminator 10>

The discriminator 10 acquires a ground-view image and an aerial-view image, and determines whether the ground-view image matches the aerial-view image. This determination may be realized in various ways. For example, the discriminator 10 extract features of the ground-view image and features of the aerial-view image, and calculate degree of similarity between the features of the ground-view image and the features of the aerial-view image. If the calculated degree of similarity is high (for example, greater than or equal to a pre-defined threshold), it is determined that the ground-view image matches the aerial-view image. On the other hand, if the calculated degree of similarity is low (for example, less than the pre-defined threshold), it is determined that the ground-view image does not match the aerial-view image.

There may be various implementations of the discriminator 10. For example, the discriminator 10 may be configured with one or more neural networks. The Siamese network disclosed by NPL1 may be used as an example of a concrete implementation of the discriminator 10.

Figure 8:
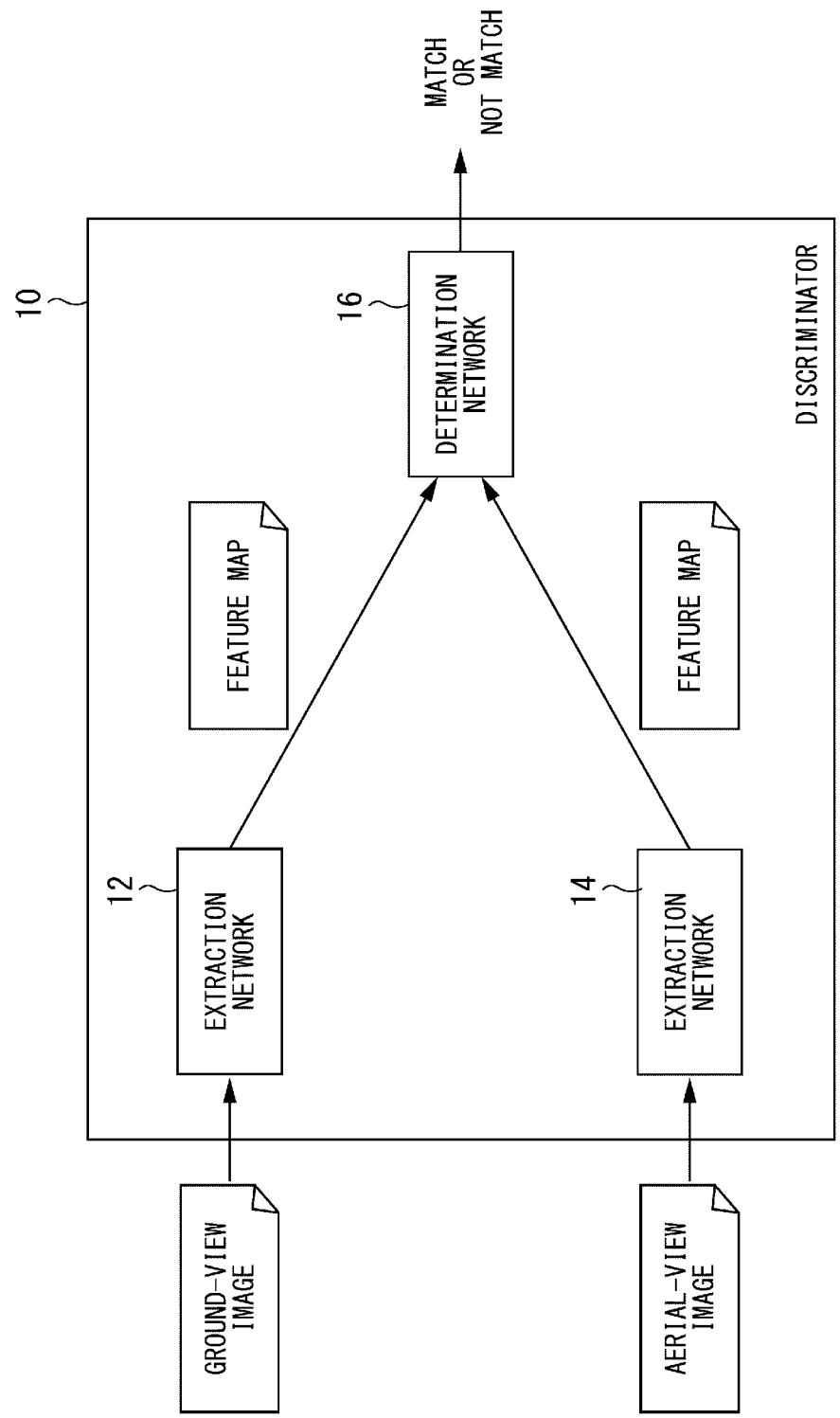
FIG. 8 illustrates a basic structure of the discriminator that is implemented with neural networks.

FIG. 8 illustrates a basic structure of the discriminator 10 that is implemented with neural networks. The discriminator 10 includes an extraction network 12, a second extraction network 14, and a determination network 16. The extraction network 12 is a neural network that acquires a ground-view image, generates one or more feature maps of the ground-view image (i.e. extracts features of the ground-view image), and outputs the generated feature maps. The extraction network 14 is a neural network that acquires an aerial-view image, generates one or more feature maps of the aerial-view image (i.e. extracts features of the aerial-view image), and outputs the generated feature maps.

The feature maps of the ground-view image and those of the aerial-view image are fed into the determination network 16. The determination network 16 analyzes the fed feature maps, and outputs data (e.g. flag) that represents whether or not the ground-view image matches the aerial-view image.
<<Example Application of Discriminator 10>>

There are various applications of the discriminator 10. For example, the discriminator 10 can be used as a part of a system (hereinafter, a geo-localization system) that performs image geo-localization. Image geo-localization is a technique to determine the place at which an input image is captured. Note that, the geo-localization system is merely an example of the application of the discriminator 10, and the application of the discriminator 10 is not limited to being used in the geo-localization system.

Figure 9:
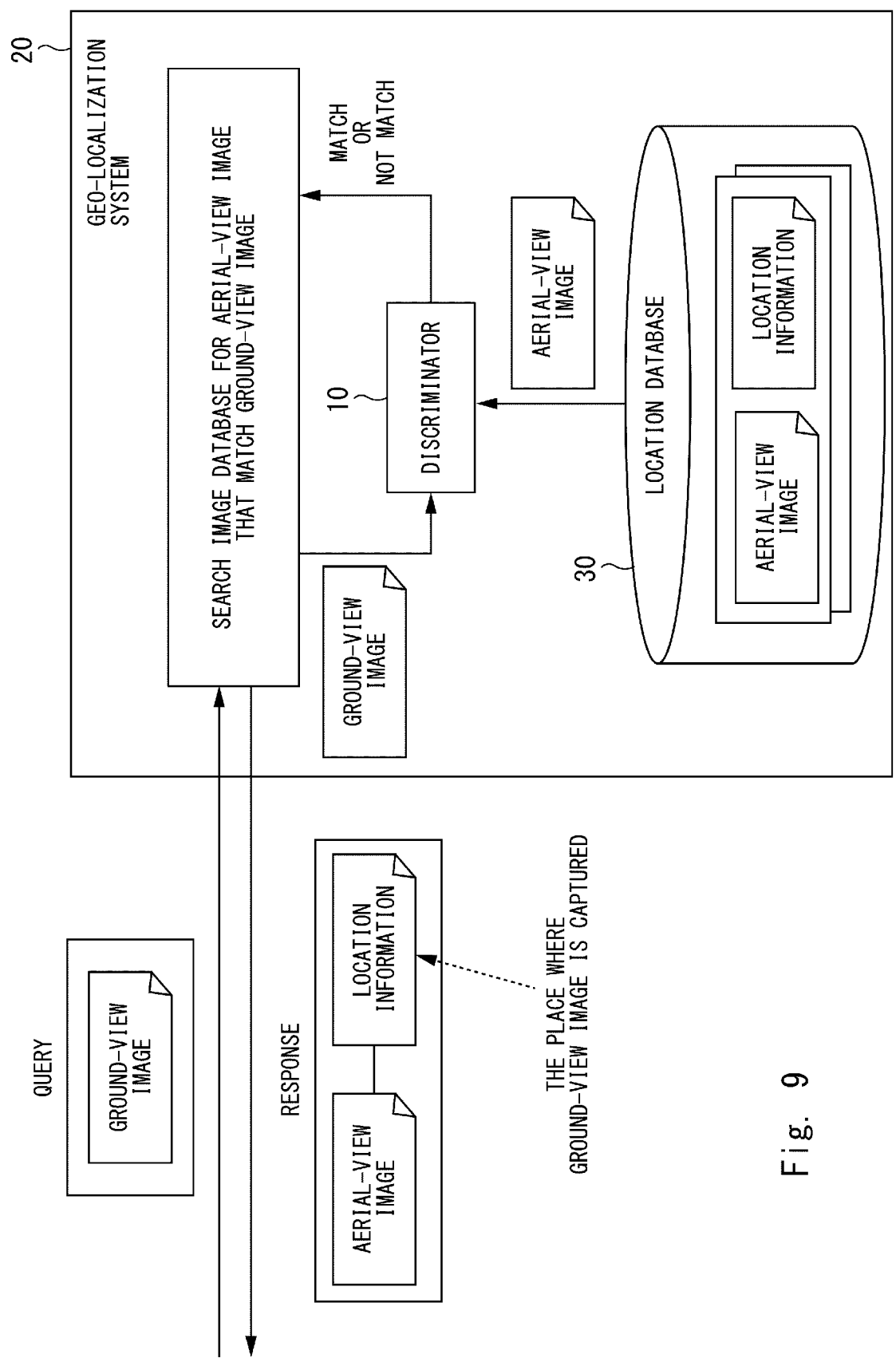
FIG. 9 illustrates a geo-localization system that includes the discriminator.

FIG. 9 illustrates a geo-localization system 20 that includes the discriminator 10. The geo-localization system 20 includes the discriminator 10 and the location database 30. The location database 30 includes a plurality of aerial-view images to each of which location information is attached. An example of the location information may be a GPS (Global Positioning System) coordinate of the place captured in the corresponding aerial-view image.

The geo-localization system 20 receives a query that includes a ground-view image from a client (e.g. user terminal), and searches the location database 30 for the aerial-view image that matches the ground-view image in the received query, thereby determining the place at which the ground-view image is captured. Specifically, until the aerial-view image that matches the ground-view image in the query is detected, the geo-localization system 20 repeatedly executes to: acquire one of the aerial-view images from the location database 30; input the ground-view image and the acquired aerial-view image into the discriminator 10; and determine whether the output of the discriminator 10 indicates that the ground-view image matches the aerial-view image. By doing so, the geo-localization system 20 can find the aerial-view image that includes the place at which the ground-view image is captured. Since the detected aerial-view image is associated with the location information such as the GPS coordinate, the geo-localization system 20 can recognize that where the ground-view image is captured is the place that is indicated by the location information associated with the aerial-view image that matches the ground-view image.

Note that the geo-localization system 20 may be implemented by one or more arbitrary computers such as ones depicted in FIG. 5.

<Acquisition of Training Data: S102>

The acquisition unit 2020 acquires the original training dataset 40 (S102). As described above, the original training dataset includes the original ground-view image 42 and the original aerial-view image 44. Hereinafter, examples of ways to acquire the training dataset will be explained.

The original training dataset 40 may be a positive example or a negative example: the former is a dataset in which the original ground-view image 42 matches the original aerial-view image 44; the latter is a dataset in which the original ground-view image 42 does not match the original aerial-view image 44.

For example, the acquisition unit 2020 acquires a ground-view image and an aerial-view image from a storage device (hereinafter, image storage device) to which the acquisition unit 2020 has access, and generates an original training dataset 40 that includes the acquired ground-view image and the acquired aerial-view image. For example, the image storage device stores plural ground-view images and aerial-view images in advance. Each image in the image storage device is associated with location information of the place at which that image is captured. As described above, the GPS coordinate is an example of the location information.

The image augmentation apparatus 2000 acquires arbitrary ground-view image from the image storage device. In the case where the acquisition unit 2020 generates a positive example, the acquisition unit 2020 acquires an aerial-view image whose location information represents the same location as or a location very close to the location represented by the location information of the acquired ground-view image. Note that "a location is very close to another location" may mean that the distance between these locations (e.g. GPS coordinates) is less than or equal to a predefined threshold. Then, the acquisition unit 2020 generates an original training dataset 40 that includes the acquired ground-view image and the acquired aerial-view image.

On the other hand, in the case where the acquisition unit 2020 generates a negative example, the acquisition unit 2020 acquires an aerial-view image whose location information represents a location different from the location represented by the ground-view image. Note that "a location is different from another location" may mean that their locations (e.g. GPS coordinates) are not equal to each other, or that the distance between these locations is greater than the predefined threshold. Then, the acquisition unit 2020 generates an original training dataset 40 that includes the acquired ground-view image, the acquired aerial-view image, and information (e.g. flag) indicating that the ground-view image does match the aerial-view image.

The acquisition unit 2020 may generate the original training dataset 40 for each possible pairs of the ground-view image and the aerial-view image stored in the image storage device. Then, the augmented training dataset 50 is generated for each of the original training dataset 40 acquired. However, the acquisition unit 2020 does not necessarily use all of the images stored in the image storage device.

Note that, in order to enable to recognize whether the original training dataset 40 is a positive example or a negative one, it is preferable that a label that indicates whether or not the original ground-view image 42 matches the aerial-view image 44 is also included in the original training dataset 40.

The acquisition unit 2020 does not necessarily generate the original training dataset 40, and original training datasets may be prepared in advance in the image storage device. In this case, the acquisition unit 2020 acquires one or more of the original training datasets 40 from the image storage device. Then, the augmented training dataset 50 is generated for each of the original training dataset 40 acquired.

<Image Augmentation Process: S104>

The image processing unit 2040 performs the image augmentation process on the original training dataset 40 to generate the augmented training dataset 50. Briefly, as described above, the image processing unit 2040 removes partial regions including objects of the specific type from the original image. The specific type may or may not be predefined.

In the case where the specific type is predefined, for example, the image processing unit 2040 acquires removal information that indicates the specific type of objects, i.e. which type of objects are to be removed from the original image. The removal information may be stored in advance in a storage device to which the image processing unit 2040 has access. Suppose that the removal information specifies a type of "road". In this case, the image processing unit 2040 detects all regions including a road from the original image (S202). Then, the image processing unit 2040 generates an augmented image by removing the detected partial regions from the original image (S204).

Figure 10:
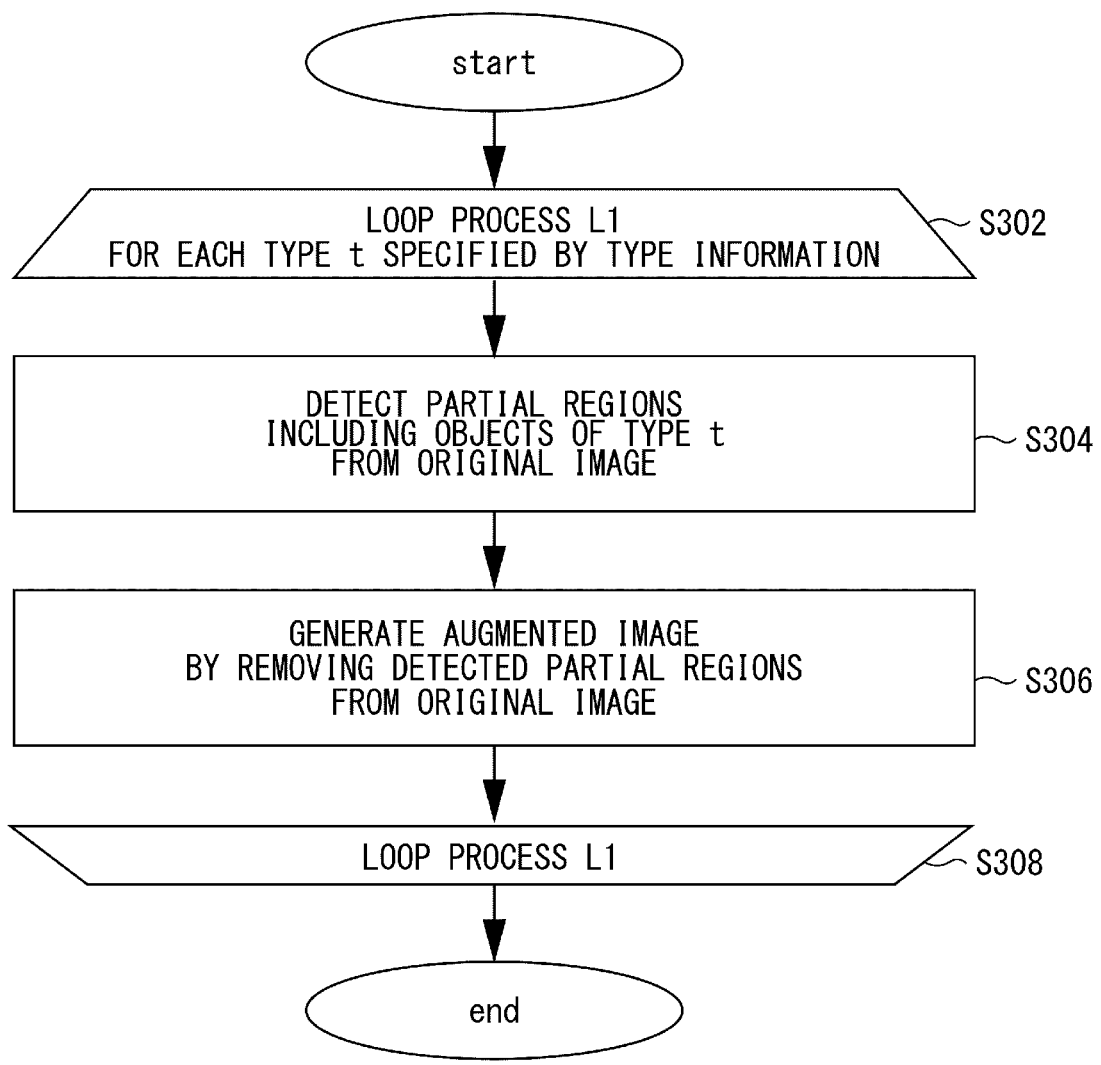
FIG. 10 illustrates an example flow of the image augmentation process in which the removal information is used.

Note that the removal information may specify plural types of objects. In this case, for example, the image processing unit 2040 handles each of the specified types in turn. FIG. 10 illustrates an example flow of the image augmentation process in which the removal information is used. Steps S302 to S308 constitute a loop process L1. The image processing unit 2040 performs the loop process L1 for each type specified by the removal information.

Specifically, at Step S302, the image processing unit 2040 checks whether it has already performed the loop process L1 for every one of the types specified by the removal information. If it has, the image processing unit 2040 terminates the image augmentation process shown in FIG. 10. If not, the image processing unit 2040 choses one of the specific types for which the loop process L1 has not been performed yet, and performs the following steps for the chosen type. The specific type chosen here is denoted by "type t".

At Step 304, the image processing unit 2040 detects partial regions including objects of type t from the original image. Then, the image processing unit 2040 generates an augmented image by removing the detected partial regions from the original image (S306). After Step S308, Step S302 is performed again.

Suppose that the removal information specifies a type of "road" and a type of "building". In this case, in the first iteration of the loop process L1, the image processing unit 2040 handles "road" as type t. Thus, the image processing unit 2040 detects all regions including roads from the original image (S304), and generates the augmented image by removing the detected partial regions from the original image (S306). In the next iteration of the loop process L1, the image processing unit 2040 handles "building" as type t. Thus, the image processing unit 2040 detects all regions including buildings from the original image (S304), and generates the augmented image by removing the detected partial regions from the original image (S306). As a result, the augmented image not including roads and the augmented image not including buildings are obtained.

When the removal information specifies plural types, the image processing unit 2040 may use not only individual specified types, but also any combination of specified types. Suppose that the removal information specifies a type of "road" and a type of "building". In this case, the image processing unit 2040 may generate the augmented image including neither roads nor buildings, in addition to the augmented image not including roads and the augmented image not including buildings.

The image processing unit 2040 does not necessarily use removal information in the image augmentation process. One of the cases where the image processing unit 2040 does not use the removal information, for example, the image processing unit 2040 may obtain information that specifies one or more types of objects that are not to be removed from the original image (in other words, one or more types of objects that are to be retained). Hereinafter, this information is described as "retaining information". In this case, the image processing unit 2040 removes partial regions not representing the objects of the type specified by the retaining information from the original image.

Suppose that the image processing unit 2040 obtains the retaining information that specifies "a road" and "a tree" as the types of objects not to be removed from the original image. In this case, the image processing unit 2040 first removes partial regions not representing roads from the original image to generate an augmented image. Then, the image processing unit 2040 removes partial regions not representing trees from the original image to generate another augmented image. In another example, the image processing unit 2040 may remove partial regions not representing roads or trees from the original image to generate an augmented image. In this case, the augmented image includes both of the partial regions representing roads and the partial regions representing a tree.

In another case where the image processing unit 2040 does not use the removal information, for example, the image processing unit 2040 detects which types of objects are included in the original image. This process can be realized by detecting multiple objects from the original image, and then categorizing the detected objects. Each image region representing a detected object is handled as a partial region. Then, the image processing unit 2040 handles one or more types of objects detected from the original image as the specific type mentioned above. Note that the image processing unit 2040 may further handle any combination of types detected from the original image.

Figure 11:
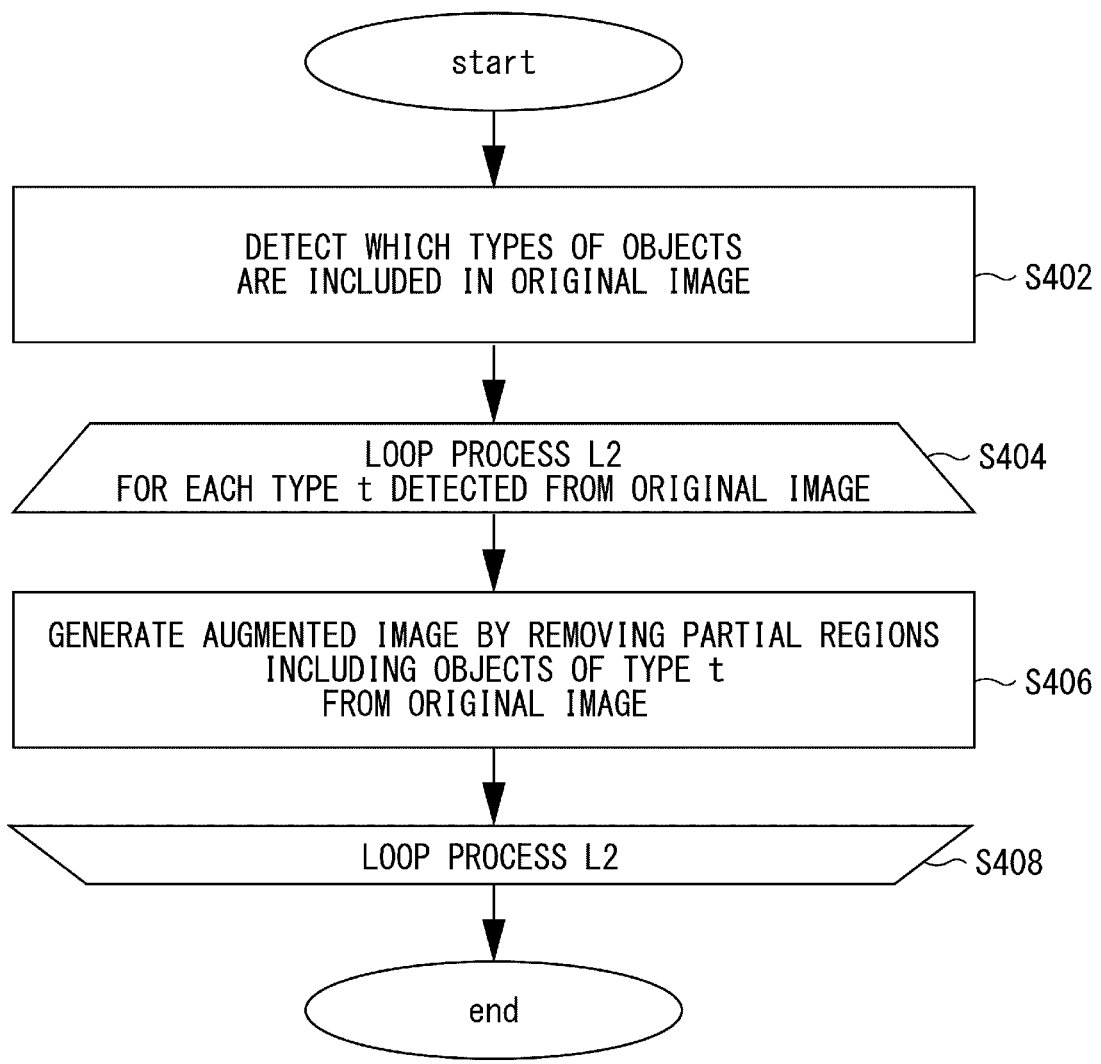
FIG. 11 illustrates an example flow of the image augmentation process in which the image processing unit detects which types of objects are included in the original image.

FIG. 11 illustrates an example flow of the image augmentation process in which the image processing unit 2040 detects which types of objects are included in the original image. The image processing unit 2040 detects which types of objects are included in the original image (S402).

The loop process L2 is performed for each of the detected types. At Step S404, the image processing unit 2040 checks whether it has already performed the loop process L2 for every one of the detected types. If it has, the image processing unit 2040 terminates the image augmentation process shown in FIG. 11. If not, the image processing unit 2040 choses one of the detected types for which the loop process L2 has not been performed yet, and performs the following steps for the chosen type. The type chosen here is denoted by "type t".

The image processing unit 2040 generates an augmented image by removing the partial regions representing the objects of type t from the original image (S406). Then, Step S404 is performed again after Step S408.

In another example, at Step S408, the image processing unit 2040 may remove the partial regions not representing objects of type t. By doing so, the augmented image is generated to include only objects of the type t.

<Removal Process of Partial Regions>

There are various ways to remove a partial region from the original image. Hereinafter, examples of those ways will be described.

<<Repaint>>

One of the ways to remove a partial region is repainting (i.e. replacement of pixels). For example, the image processing unit 2040 may repaint the partial region with a predefined color as shown in FIG. 3, or with a predefined pattern. The predefined color may be an arbitrary color, such as black, white, etc. The predefined pattern may be an arbitrary pattern, such as a random noise, a dot pattern, a lattice pattern, etc.

In another way to remove a partial region, the image processing unit 2040 may repaint a partial region by image inpainting. Image inpainting is a technique to complement missing parts of an image to present a complete image. For example, the image processing unit 2040 fills the partial region with pixels of a single color such as black, and then performs the image inpainting on the original image to repaint that partial region.

Image inpainting is effective for removing temporary features from the original image. It is possible that temporary features in the ground-view image may not be included in the aerial-view image to be matched that ground-view image and vice versa due to the time different between the time when that ground-view image was captured and the time when that aerial-view image was captured. Thus, in order to train the discriminator 10 to be robust to such a time difference, it is preferable to remove temporary features from the image in the training dataset.

<<Superimposition>>

Superimposition is still another way to remove a partial region from the original image. Specifically, the image processing unit 2040 may superimpose an image larger than the partial region on the partial region so that a whole of the partial region is overwritten by that image. Hereinafter, the image superimposed on the partial region to be removed is called "secondary image".

Superimposition of the secondary image is effective for hiding shape information of objects removed from the original image. In the case where the augmented image includes edges of the removed objects, although those objects are removed from the image to be included in the training dataset, it is possible to train the discriminator 10 to leverage the shape information of those removed objects. In accordance with the superimposition of the secondary image on the partial region, the augmented image is generated not to include the edges of the objects to be removed. Thus, it is possible to train the discriminator 10 not to use the shape information of the removed objects.

There are various kinds of images that can be used as the secondary image. For example, the secondary image is an image having a predefined shape and being painted a predefined color or a predefined pattern. The predefined shape may be an arbitrary shape, such as a rectangle, circle, etc. The predefined color may be an arbitrary color, such as black, white, etc. The predefined pattern may be an arbitrary pattern, such as a random noise, a dot pattern, a lattice pattern, etc.

Figure 12:
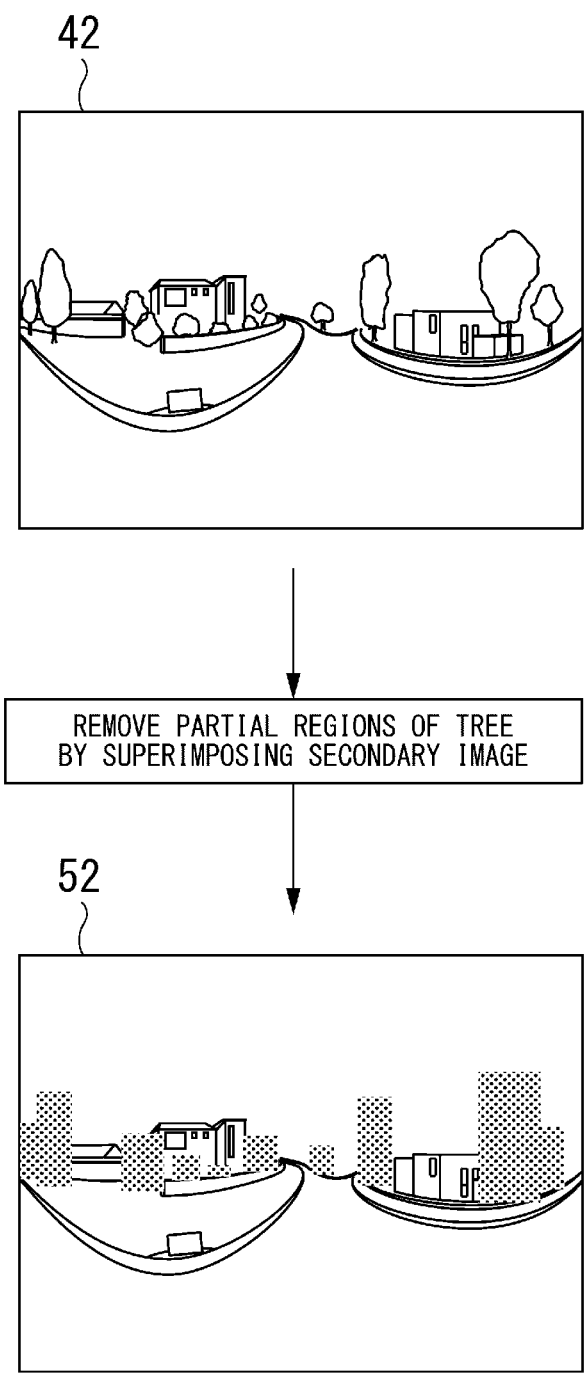
FIG. 12 illustrates the superimposition of the secondary image on the partial region of the original image.

FIG. 12 illustrates the superimposition of the secondary image on the partial region of the original image. In this case, the specific type of objects to be removed from the original image is "a tree". Thus, the image processing unit 2040 superimpose the secondary image on each of the partial regions representing trees. In this example, the secondary image is a bounding box of the partial region to be removed and filled with a dot pattern.

Note that although a single secondary image is superimposed on each of the partial regions in FIG. 12, the image processing unit 2040 may superimpose a single secondary image on multiple partial regions, or multiple secondary images on a single partial region.

The size of the secondary image may be determined based on the size of the partial region on which the secondary image is to be superimposed. For example, in the case of FIG. 12, the image processing unit 2040 generates a bounding box for each partial region as a secondary image, thereby dynamically determining the size of the respective secondary images. In another example, multiple secondary images with sizes different from each other are stored in a storage device in advance. In this case, for example, the image processing unit 2040 obtains the secondary image with the minimum size with which a whole of the partial region can be overwritten.

Note that, the above-mentioned result from "superimposing a secondary image on a region of the original image" can also be achieved by "repainting that region of the original image with the pixels constituting the secondary image".

The image processing unit 2040 may perform image inpainting on the secondary image that is superimposed on the original image. For example, the image processing unit 2040 superimposes the secondary images filled with black pixels on the partial regions. Then, the image processing unit 2040 performs the image inpainting on the original image on which the secondary images are superimposed, thereby generating the augmented image. By doing so, as mentioned above, the augmented image can be generated not to include temporary features.

<Output from Image Augmentation Apparatus 2000>

The image augmentation apparatus 2000 may output the augmented training dataset 50 (S106). When multiple augmented images are generated, the image augmentation apparatus 2000 may generate the augmented training dataset 50 for each of the augmented images. Suppose that the augmented ground-view images AG1 and AG2 are generated from the original ground-view image OG, and the augmented aerial-view images AA1 and AA2 are generated from the original aerial-view image OA. In this case, the augmented training dataset 50 may be generated for each of the following pairs: (OG, AA1), (OG, AA2), (AG1, OA), (AG1, AA1), (AG1, AA2), (AG2, OA), (AG2, AA1), and (AG2, AA2).

Note that the augmented training dataset may further include a label that indicates whether the ground-view image matches the aerial-view image. When the image augmentation apparatus 2000 generates the augmented training dataset 50 from the original training dataset 40 of the positive example, the augmented training dataset 50 is generated to include the label indicating that the ground-view image matches the augmented aerial-view image. On the other hand, when the image augmentation apparatus 2000 generates the augmented training dataset 50 from the original training dataset 40 of the negative example, the augmented training dataset 50 is generated to include the label indicating that the ground-view image does not match the aerial-view image.

The augmented training dataset 50 may be output in an arbitrary manner. For example, the output unit 2060 may put the augmented training dataset 50 into a storage device, or send the augmented training dataset 50 to an apparatus that trains the discriminator 10.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

<Supplementary Notes>

(Supplementary Note 1)

An image augmentation apparatus comprising:
at least one processor; and
memory storing instructions,
wherein the at least one processor is configured to execute the instructions to:
acquire an original training dataset including an original ground-view image and an original aerial-view image;
perform a removal process in which partial regions including objects of a specific type are removed, the removal process being performed: on the original ground-view image to generate the augmented ground-view image: on the original aerial-view image to generate the augmented aerial-view image; or both; and
output an augmented training dataset that includes: the original ground-view image and the augmented aerial-view image; the augmented ground-view image and the original aerial-view image; or the augmented ground-view image and the augmented aerial-view image.

(Supplementary Note 2)

The image augmentation apparatus according to supplementary note 1,
wherein the at least one processor is further configured to acquire removal information that specifies one or more types of objects to be removed, and for one or more of the types specified by the removal information, the removal process is performed with the partial regions including objects of that type as subjects thereof.

(Supplementary Note 3)

The image augmentation apparatus according to supplementary note 1,
wherein the at least one processor is further configured to acquire retaining information that specifies one or more types of objects not to be removed, and
for one or more of the types specified by the retaining information, the removal process is performed with the partial regions not including objects of that type as subjects thereof.

(Supplementary Note 4)

The image augmentation apparatus according to supplementary note 1,
wherein the at least one processor is further configured to detect which types of objects are included in the original ground-view image or the original aerial-view image, and
for one or more of the detected types, the removal process is performed with the partial regions including that detected type as subjects thereof.

(Supplementary Note 5)

The image augmentation apparatus according to supplementary note 1,
wherein the at least one processor is further configured to detect which types of objects are included in the original ground-view image or the original aerial-view image, and
for one or more of the detected types, the removal process is performed with the partial regions not including that detected type as subjects thereof.

(Supplementary Note 6)

The image augmentation apparatus according to any one of supplementary notes 1 to 5,
wherein the removal process includes to repaint the partial regions with a specific color or a specific pattern.

(Supplementary Note 7)

The image augmentation apparatus according to any one of supplementary notes 1 to 5,
wherein the removal process includes to perform image inpainting on the partial regions.

(Supplementary Note 8)

The image augmentation apparatus according to any one of supplementary notes 1 to 5,
wherein the removal process includes to superimpose one or more images on the partial regions.

(Supplementary Note 9)

The image augmentation apparatus according to supplementary note 8,
wherein the removal process further includes to perform image inpainting on the images that are superimposed on the partial regions.

(Supplementary Note 10)

A control method performed by a computer, comprising:
acquiring an original training dataset including an original ground-view image and an original aerial-view image;
performing a removal process in which partial regions including objects of a specific type are removed, the removal process being performed: on the original ground-view image to generate the augmented ground-view image: on the original aerial-view image to generate the augmented aerial-view image; or both; and
outputting an augmented training dataset that includes: the original ground-view image and the augmented aerial-view image; the augmented ground-view image and the original aerial-view image; or the augmented ground-view image and the augmented aerial-view image.

(Supplementary Note 11)

The control method according to supplementary note 10, further comprising:
acquiring removal information that specifies one or more types of objects to be removed,
wherein, for one or more of the types specified by the removal information, the removal process is performed with the partial regions including objects of that type as subjects thereof.

(Supplementary Note 12)

The control method according to supplementary note 10, further comprising:
acquiring retaining information that specifies one or more types of objects not to be removed, and
for one or more of the types specified by the retaining information, the removal process is performed with the partial regions not including objects of that type as subjects thereof.

(Supplementary Note 13)

The control method according to supplementary note 10, further comprising:
detecting which types of objects are included in the original ground-view image or the original aerial-view image, and
for one or more of the detected types, the removal process is performed with the partial regions including that detected type as subjects thereof.

(Supplementary Note 14)

The control method according to supplementary note 10, further comprising:

detecting which types of objects are included in the original ground-view image or the original aerial-view image, and for one or more of the detected types, the removal process is performed with the partial regions not including that detected type as subjects thereof.

(Supplementary Note 15)

The control method according to any one of supplementary notes 10 to 14, wherein the removal process includes to repaint the partial regions with a specific color or a specific pattern.

(Supplementary Note 16)

The control method according to any one of supplementary notes 10 to 14, wherein the removal process includes to perform image inpainting on the partial regions.

(Supplementary Note 17)

The control method according to any one of supplementary notes 10 to 14, wherein the removal process includes to superimpose one or more images on the partial regions.

(Supplementary Note 18)

The control method according to supplementary note 17, wherein the removal process further includes to perform image inpainting on the images that are superimposed on the partial regions.

(Supplementary Note 19)

A non-transitory computer-readable storage medium storing a program that causes a computer to execute:

acquiring an original training dataset including an original ground-view image and an original aerial-view image;

performing a removal process in which partial regions including objects of a specific type are removed, the removal process being performed: on the original ground-view image to generate the augmented ground-view image: on the original aerial-view image to generate the augmented aerial-view image; or both; and outputting an augmented training dataset that includes: the original ground-view image and the augmented aerial-view image; the augmented ground-view image and the original aerial-view image; or the augmented ground-view image and the augmented aerial-view image.

(Supplementary Note 20)

The storage medium according to supplementary note 19, wherein the program causes the computer to further execute acquiring removal information that specifies one or more types of objects to be removed, and for one or more of the types specified by the removal information, the removal process is performed with the partial regions including objects of that type as subjects thereof.

(Supplementary Note 21)

The storage medium according to supplementary note 19, wherein the program causes the computer to further execute acquiring retaining information that specifies one or more types of objects not to be removed, and for one or more of the types specified by the retaining information, the removal process is performed with the partial regions not including objects of that type as subjects thereof.

(Supplementary Note 22)

The storage medium according to supplementary note 19, wherein the program causes the computer to further execute detecting which types of objects are included in the original ground-view image or the original aerial-view image, and for one or more of the detected types, the removal process is performed with the partial regions including that detected type as subjects thereof.

(Supplementary Note 23)

The storage medium according to supplementary note 19, wherein the program causes the computer to further execute detecting which types of objects are included in the original ground-view image or the original aerial-view image, and for one or more of the detected types, the removal process is performed with the partial regions not including that detected type as subjects thereof.

(Supplementary Note 24)

The storage medium according to any one of supplementary notes 19 to 23, wherein the removal process includes to repaint the partial regions with a specific color or a specific pattern.

(Supplementary Note 25)

The storage medium according to any one of supplementary notes 19 to 23, wherein the removal process includes to perform image inpainting on the partial regions.

(Supplementary Note 26)

The storage medium according to any one of supplementary notes 19 to 23, wherein the removal process includes to superimpose one or more images on the partial regions.

(Supplementary Note 27)

The storage medium according to supplementary note 26, wherein the removal process further includes to perform image inpainting on the images that are superimposed on the partial regions.

REFERENCE SIGNS LIST 10 discriminator
12 extraction network
14 extraction network
16 determination network
20 geo-localization system
30 location database
40 original training dataset
42 original ground-view image
44 original aerial-view image
50 augmented training dataset
52 augmented ground-view image
54 augmented aerial-view image
1000 computer
1020 bus
1040 processor
1060 memory
1080 storage device
1100 input/output interface
1120 network interface
2000 image augmentation apparatus
2020 acquisition unit
2040 image processing unit
2060 output unit

What is claimed is:

1. An image augmentation apparatus comprising: at least one processor; and memory storing instructions, wherein the at least one processor is configured to execute the instructions to: acquire an original training dataset including an original ground-view image and an original aerial-view image; perform a removal process in which partial regions including objects of a specific type are removed, the removal process being performed: on the original ground-view image to generate an augmented ground-view image: on the original aerial-view image to generate an augmented aerial-view image; or both; and output an augmented training dataset that includes: the original ground-view image and the augmented aerial-view image; the augmented ground-view image and the original aerial-view image; or the augmented ground-view image and the augmented aerial-view image.

2. The image augmentation apparatus according to claim 1,
wherein the at least one processor is further configured to acquire removal information that specifies one or more types of objects to be removed, and
for one or more of the types specified by the removal information, the removal process is performed with the partial regions including objects of that type as subjects thereof.

3. The image augmentation apparatus according to claim 1,
wherein the at least one processor is further configured to acquire retaining information that specifies one or more types of objects not to be removed, and
for one or more of the types specified by the retaining information, the removal process is performed with the partial regions not including objects of that type as subjects thereof.

4. The image augmentation apparatus according to claim 1,
wherein the at least one processor is further configured to detect which types of objects are included in the original ground-view image or the original aerial-view image, and
for one or more of the detected types, the removal process is performed with the partial regions including that detected type as subjects thereof.

5. The image augmentation apparatus according to claim 1,
wherein the at least one processor is further configured to detect which types of objects are included in the original ground-view image or the original aerial-view image, and
for one or more of the detected types, the removal process is performed with the partial regions not including that detected type as subjects thereof.

6. The image augmentation apparatus according to claim 1 wherein the removal process includes repainting the partial regions with a specific color or a specific pattern.

7. The image augmentation apparatus according to claim 1, wherein the removal process includes performing image inpainting on the partial regions.

8. A control method performed by a computer, comprising: acquiring an original training dataset including an original ground-view image and an original aerial-view image; performing a removal process in which partial regions including objects of a specific type are removed, the removal process being performed: on the original ground-view image to generate an augmented ground-view image: on the original aerial-view image to generate an augmented aerial-view image; or both; and outputting an augmented training dataset that includes: the original ground-view image and the augmented aerial-view image; the augmented ground-view image and the original aerial-view image; or the augmented ground-view image and the augmented aerial-view image.

9. The control method according to claim 8, further comprising:
acquiring removal information that specifies one or more types of objects to be removed,
wherein, for one or more of the types specified by the removal information, the removal process is performed with the partial regions including objects of that type as subjects thereof.

10. The control method according to claim 8, further comprising:
acquiring retaining information that specifies one or more types of objects not to be removed, and
for one or more of the types specified by the retaining information, the removal process is performed with the partial regions not including objects of that type as subjects thereof.

11. The control method according to claim 8, further comprising:
detecting which types of objects are included in the original ground-view image or the original aerial-view image, and
for one or more of the detected types, the removal process is performed with the partial regions including that detected type as subjects thereof.

12. The control method according to claim 8, further comprising:
detecting which types of objects are included in the original ground-view image or the original aerial-view image, and
for one or more of the detected types, the removal process is performed with the partial regions not including that detected type as subjects thereof.

13. The control method according to claim 8, wherein the removal process includes repainting the partial regions with a specific color or a specific pattern.

14. The control method according to claim 8, wherein the removal process includes performing image inpainting on the partial regions.

15. A non-transitory computer-readable storage medium storing a program that causes a computer to execute: acquiring an original training dataset including an original ground-view image and an original aerial-view image; performing a removal process in which partial regions including objects of a specific type are removed, the removal process being performed: on the original ground-view image to generate an augmented ground-view image: on the original aerial-view image to generate an augmented aerial-view image; or both; and outputting an augmented training dataset that includes: the original ground-view image and the augmented aerial-view image; the augmented ground-view image and the original aerial-view image; or the augmented ground-view image and the augmented aerial-view image.

16. The storage medium according to claim 15,
wherein the program causes the computer to further execute
acquiring removal information that specifies one or more types of objects to be removed, and
for one or more of the types specified by the removal information, the removal process is performed with the partial regions including objects of that type as subjects thereof.

17. The storage medium according to claim 15,
wherein the program causes the computer to further execute
acquiring retaining information that specifies one or more types of objects not to be removed, and
for one or more of the types specified by the retaining information, the removal process is performed with the partial regions not including objects of that type as subjects thereof.

18. The storage medium according to claim 15,
wherein the program causes the computer to further execute detecting which types of objects are included in the original ground-view image or the original aerial-view image, and for one or more of the detected types, the removal process is performed with the partial regions including that detected type as subjects thereof.

19. The storage medium according to claim 15,
wherein the program causes the computer to further execute detecting which types of objects are included in the original ground-view image or the original aerial-view image, and for one or more of the detected types, the removal process is performed with the partial regions not including that detected type as subjects thereof.

20. The storage medium according to claim 15, wherein the removal process includes repainting the partial regions with a specific color or a specific pattern.

\* \* \* \* \*